US010635512B2

(12) United States Patent
Pepin et al.

(10) Patent No.: US 10,635,512 B2
(45) Date of Patent: Apr. 28, 2020

(54) IN-PRODUCT NOTIFICATIONS TARGETING SPECIFIC USERS SELECTED VIA DATA ANALYSIS

(71) Applicant: Microsoft Technology Licensing, LLC, Redmond, WA (US)

(72) Inventors: Louis Carl Pepin, Seattle, WA (US); Ryan Alexander Dawson, Redmond, WA (US); Gianting Yeh, Kirkland, WA (US); Ritesh Rambhai Parikh, Redmond, WA (US); Ashok Cholpady Kamath, Sammamish, WA (US); Sebastien Daniel Guillemot, Bellevue, WA (US); Bertan Aygun, Issaquah, WA (US); Alex Jordan Yuter, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 278 days.

(21) Appl. No.: 15/467,923

(22) Filed: Mar. 23, 2017

(65) Prior Publication Data
US 2018/0276058 A1 Sep. 27, 2018

(51) Int. Cl.
*G06F 9/54* (2006.01)
*G06F 16/2453* (2019.01)
(52) U.S. Cl.
CPC ........ *G06F 9/546* (2013.01); *G06F 16/24539* (2019.01)

(58) Field of Classification Search
CPC .......................... G06F 9/546; G06F 16/24539
See application file for complete search history.

(56) References Cited

U.S. PATENT DOCUMENTS

| 7,703,611 | B1 | 4/2010 | Appelman et al. |
| 9,149,189 | B2 | 10/2015 | Proud |
| 2009/0144104 | A1 | 6/2009 | Johnson |
| 2013/0191471 | A1 | 7/2013 | Evans et al. |
| 2014/0279707 | A1 | 9/2014 | Joshua et al. |
| 2014/0336791 | A1 | 11/2014 | Asenjo et al. |
| 2016/0028677 | A1 | 1/2016 | Narasimhan et al. |
| 2016/0048597 | A1 | 2/2016 | Onuma et al. |
| 2016/0352664 | A1 | 12/2016 | Braines et al. |
| 2018/0210802 | A1* | 7/2018 | Anderson ........... G06F 11/3476 |
| 2018/0276104 | A1* | 9/2018 | Calla ..................... G06F 11/366 |

FOREIGN PATENT DOCUMENTS

WO 2016192029 A1 12/2016

OTHER PUBLICATIONS

"Firebase Notifications", https://firebase.google.com/docs/notifications/, Retrieved on: Jan. 31, 2017, 3 pages.
(Continued)

*Primary Examiner* — Brian W Wathen
*Assistant Examiner* — Kimberly L Jordan
(74) *Attorney, Agent, or Firm* — Workman Nydegger

(57) ABSTRACT

Systems and methods for sending in-product notifications to individual users of a software product or a specifically identified subset of users of the software product selected via their previously observed interactions with the software product.

20 Claims, 3 Drawing Sheets

(56) References Cited

OTHER PUBLICATIONS

Layman, et al., "MimEc: intelligent user notification of faults in the eclipse IDE", In Proceedings of International Workshop on Cooperative and Human Aspects of Software Engineering, May 13, 2008, pp. 73-76.

"Notification Hubs Overview", Retrieved from: <<https://docs.microsoft.com/en-us/previous-versions/azure/azure-services/jj927170(v=azure.100)>>, Nov. 11, 2015, 5 Pages.

* cited by examiner

IN-PRODUCT NOTIFICATIONS TARGETING SPECIFIC USERS SELECTED VIA DATA ANALYSIS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

In the context of such cloud and remote based services, it is quite common for the service provider to need to communicate with users of the software or service. One common form of communication is through broadcast notifications that are sent to all users of the software or service, either through separate communications channels or via communications mechanisms incorporated into the application itself. With complex software products and services, a wide variety of notifications may sometimes be necessary or appropriate, many of which may be relevant to a subset of users only. As the number of notifications increases, and particularly as the number of notifications users receive that are not relevant to the particular user, users may begin to suffer what has come to be known as "notification fatigue," which may cause users to begin to ignore such notifications, even those that might be relevant to the particular user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The methods and systems disclosed herein leverage the identity of users to target notifications to a specific set of users who have been selected based on certain criteria. Each targeted notification is then sent only to the identified set of users for whom the notification is relevant. Thus, the methods and systems disclosed herein help reduce irrelevant notifications from being sent to users, thereby increasing the probability of users taking note of a targeted notification and taking action based on the notification.

In one embodiment, the methods and systems disclosed herein send in-product notifications to individual users of a software product or to a specifically identified subset of users of the software product selected via their previously observed interactions with the software product by: collecting telemetry data associated with each user of the software product relating to the user's interactions with or use of the software product and store the telemetry data in a telemetry data database; generating a message and a set of criteria for identifying those users for which the message is relevant; querying the telemetry data database to identify all users of the software product that satisfy the criteria associated with the message and to create an identified subset of users to receive the message; and providing an in-product notification of the message to the identified subset of users. The methods and systems can also include additional features, including: tracking, in the telemetry data database, which users have received an in-product notification for a particular message; storing each message and its corresponding criteria in a notification database; for each message stored in the notification database, periodically querying the telemetry data database to identify any additional users who satisfy the criteria associated with the message and have not previously received an in-product notification of the message and providing additional in-product notifications of the message to the additional users; and tracking, in the notification database, each time a particular message is returned to any user and periodically querying the notification database and deleting any messages that have not been provided to any user for a time interval that equals or exceeds a predetermined period of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following disclosure is directed to methods and systems that leverage the identity of users to target notifications to a specific set of users who have been selected based on certain criteria and/or the user's prior interactions with the system. Each targeted notification is then sent only to the identified set of users for whom the notification is relevant. Thus, the methods and systems disclosed herein help reduce irrelevant notifications from being sent to users, thereby increasing the probability of users taking note of a targeted notification and taking action based on the notification.

The technology will be described below in the context of a networked or cloud computing environment. However, those skilled in the art will readily understand and appreciate that the disclosed systems and methods can be readily adapted to other computing environments.

Figure 1:
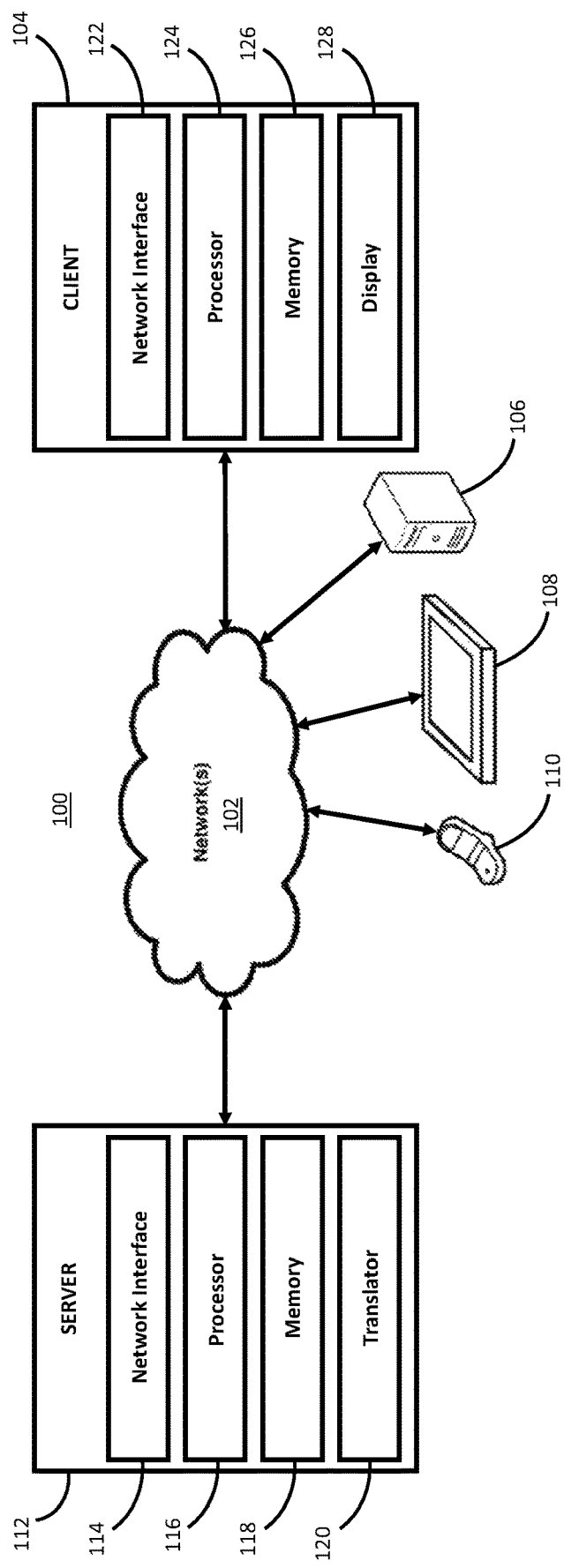
FIG. 1 schematically illustrates a functional block diagram of a basic networked computing environment.

FIG. 1 schematically illustrates a simplified functional block diagram of a networked computing environment 100 in which the disclosed technology may be practiced. Networked computing environment 100 includes a plurality of computing devices interconnected through one or more networks 102. The one or more networks 102 can allow a particular computing device to connect to and communicate with another computing device. The depicted computing devices can include one or more client devices 104. Client devices 104 may take a variety of different forms, such as, for example, a desk top computer 106, a laptop or tablet 108, or other portable or hand-held computing device, such as a mobile phone 110, etc. In some embodiments, the plurality of computing devices may include other computing devices not shown and may include more than or less than the number of computing devices shown in FIG. 1.

The one or more networks 102 may include a secure network such as an enterprise private network, an unsecure network such as a wireless open network, a local area network (LAN), a wide area network (WAN), and the Internet. Each network of the one or more networks 102 may include hubs, bridges, routers, switches, and wired transmission media such as a wired network or direct-wired connection.

The networked computing environment 100 can also include one more server devices 112 that can connect with other devices via network(s) 102. Server 112 can exchange instructions with a client to enable various web services to be provided to the client via the network. Server 112, which can also comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 112 can include a network interface 114, processor 116, memory 118, and translator 120, all in communication with each other. Network interface 114 allows server 112 to connect to one or more networks 102. Network interface 114 may include a wireless network interface, a modem, and/or a wired network interface. Processor 116 allows server 112 to execute computer readable instructions stored in memory 118 in order to perform processes discussed herein. Translator 120 may include mapping logic for translating a first file of a first file format into a corresponding second file of a second file format (i.e., the second file may be a translated version of the first file). Translator 120 may be configured using file mapping instructions that provide instructions for mapping files of a first file format (or portions thereof) into corresponding files of a second file format. In some embodiments, server 112 may include other components, functions and features not shown in FIG. 1.

One embodiment of client device 104 can include a network interface 122, processor 124, memory 126, and display 128, all in communication with each other. Network interface 122 allows client device 104 to connect to one or more networks 102. Network interface 122 may include a wireless network interface, a modem, and/or a wired network interface. Processor 124 allows client device 104 to execute computer readable instructions stored in memory 126 in order to perform processes discussed herein. Display 128 may comprise any visible display for displaying information to a user of the client device. In some embodiments, client device 104 may include other components, functions and features not shown in FIG. 1.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one embodiment of the technology: a cloud service stores a collection of notifications intended for users based on a set of predetermined criteria specific to each notification; a client software product invokes a web API with information about the user and software configuration; the web API accepts user and product configuration information and looks up applicable notifications in storage and returns them to the client; and the client software displays any notifications returned by the web API to the user.

Figure 2:
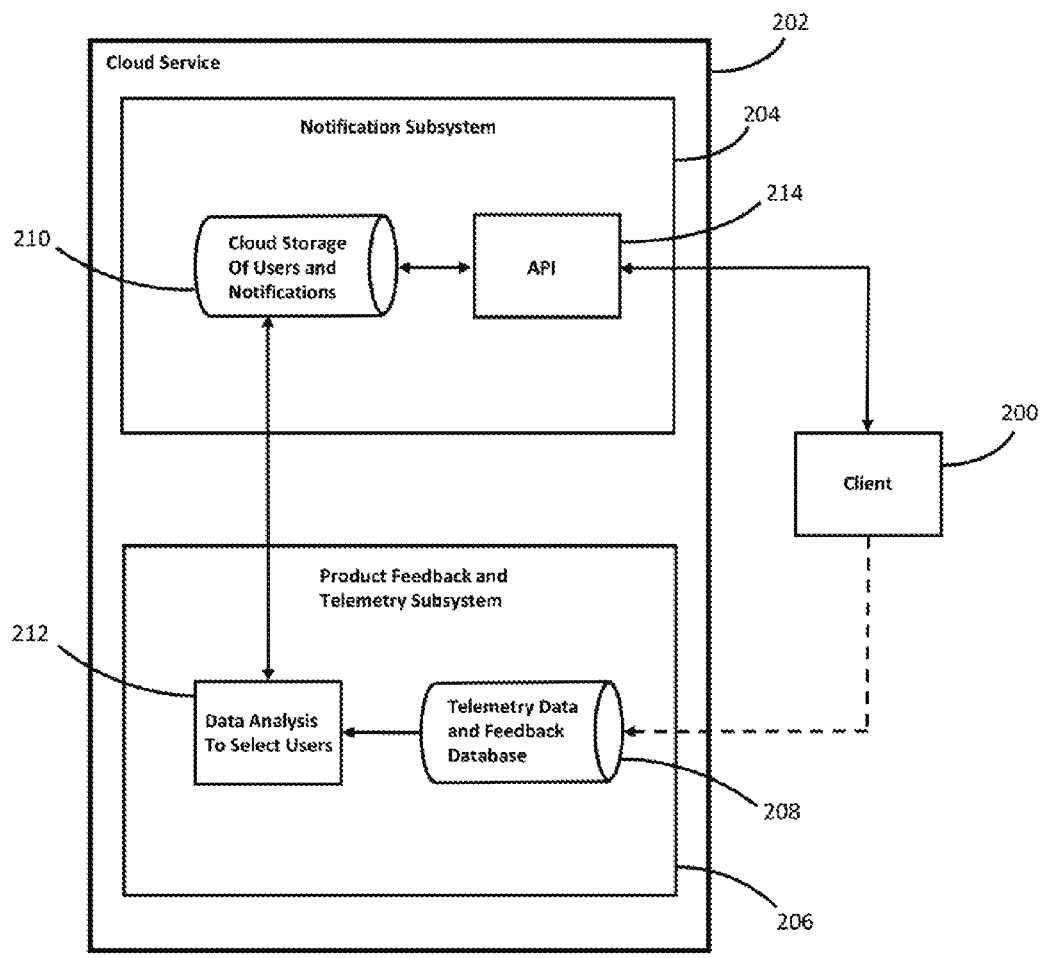
FIG. 2 schematically illustrates a functional block diagram of one embodiment of the technology disclosed herein.

Referring now to FIG. 2. FIG. 2 schematically illustrates a functional block diagram of one possible embodiment of the technology. As illustrated, a client 200 running a client software product can connect, via one more networks (not shown in FIG. 2), with a cloud service 202. The client software product can exchange data and instructions with application or software residing within the cloud to perform a wide variety of computing functions. In one embodiment, the cloud service 202 can include, among other components, functions and features, a notification subsystem 204 and a product feedback and telemetry data subsystem 206.

Many web-based applications collect telemetry data associated with users of the cloud service, which can be collected and stored in a telemetry data and feedback database 208. In cases where a user explicitly elects to allow the cloud service to collect information about the user's identity and/or biographical information, such telemetry data can be associated with a particular user ID, online user ID, machine ID, instance ID or similar ID used by the system to identify a particular user. Some applications may only collect basic telemetry data, such as client side configuration data (such as version, locale, SKU, etc.) and user information (such as a UserID). However, many web-based applications also allow users to opt-in to provide a rich complement of telemetry data as a means to assist the application service provider in improving the cloud service and providing an improved user experience. Such telemetry data can focus primarily on conditions that exist within the cloud service itself, and not conditions external to the application. In such cases, the cloud service may be able to monitor and log any number of parameters relating to the user's interactions with and/or use of the cloud services, all of which are associated with the specific, individual user. In addition, cloud services also commonly provide various mechanisms for users to directly provide feedback to the service provider, such as to report bugs in the software or other performance issues, which can also be stored in database 208. In the context of Microsoft Visual Studio, for example, the Visual Studio IDE sends telemetry or the users report issues via a feedback system incorporated into Visual Studio. All of this data can be analyzed to identify users to whom a particular message or notification may be relevant.

With targeted notifications, whenever a message or notification needs to be transmitted to a subset of users, the message is generated. The message can include various components, such as text, graphics, links, etc. For example, a particular message could notify certain users of a specific issue or problem encountered with the cloud service, inform the targeted users that a program fix is in progress, and/or inform the targeted users once the problem has been corrected, etc.

In addition to generating the message to be sent, a set of criteria can also be generated that can be used to identify those users to which the message is relevant. In general, the criteria used to identify targeted users can focus primarily on conditions within the cloud service itself, and not conditions external to the application. For example, if an issue were to be encountered that involved a particular function, feature or tool within the cloud service, such as within a particular debugging tool for example, the criteria for a message to address that issue would include criteria that would enable the targeted notification system to uniquely identify only those users who have used that particular debugging tool. The scope of potential criteria used and the potential resolution in identifying specific users is only limited by the richness of the available telemetry data collected. Once generated, each targeted notification, together with its associated criteria, can be saved into a notifications database, such as cloud storage of users and notification database 210.

Periodically, the product feedback and telemetry subsystem 206, via a data analysis module 212, can query or analyze the telemetry data previously collected to identify, for each message or notification, those users who satisfy the criteria associated with that particular message or notification. Here, again, analysis of the telemetry data can focus primarily on conditions existing within the cloud service itself, and not conditions external to the application. Once the subset of users have been identified for a particular message, then the list of users who should receive that message can also be associated with its corresponding notification and stored in notifications database 210 along the notification and associated criteria. Data analysis module 212 can include or employ any suitable means of querying or analyzing the telemetry data to identify the desired subset of users. The result of the data analysis is uploaded to notification database 210, which then contains the details of notifications and the specific list of users that these notifications need to be sent to along with information about the product configuration (e.g., Version, Locale, SKU).

Each time a specific user connects with the cloud service 202, a process within the cloud service 202 can check the notification database to determine whether any notifications for that user are present. In one embodiment, the cloud service 202 can expose an API 214 that client 200 calls at every startup with details of the current client side configuration and user information for client 200. In other implementations, however, client 200 can call API 214 at other times. For example, client 200 may not call API 214 at startup but instead call the API 214 at some predetermined interval of time (e.g., every 30 minutes during a session). The cloud service 202 can then use the user information, such as the UserID, machineID, etc., to check against the notifications database 210 to see if any previously undelivered notifications for that particular user are present in the database. If so, then the messages can be returned to the user and displayed to the user via an in-product notification within the client application. The method and systems described herein can be adapted to display the notifications on the client machine via any known means. For example, the notifications can be displayed via a notification hub or via a pop-up modal dialog. Once a particular message has been returned to a user, then the notifications database 210 can be updated to mark that notification as having been delivered.

The forgoing processes can be initiated and updated periodically, either manually or based on a predetermined schedule. For example, product feedback and telemetry subsystem 206 can collect feedback and telemetry data for analysis based on a given schedule. Similarly, cloud service 202 can be programmed to cause the data analysis module 212 to periodically (e.g., daily, weekly, monthly, etc.) query the telemetry data database 208 to identify any additional users who satisfy the criteria associated with each message and that have not previously been marked as having been returned to a specific user, and then provide additional in-product notifications of the message to the additional users.

Notifications previously saved within the notifications database 210 can be manually deleted or deleted based on a predetermined schedule. In addition, the cloud service 202 can periodically scan the notification database 210 and delete any message that have not been provided to any user for a time interval that equals or exceeds a predetermined period of time.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
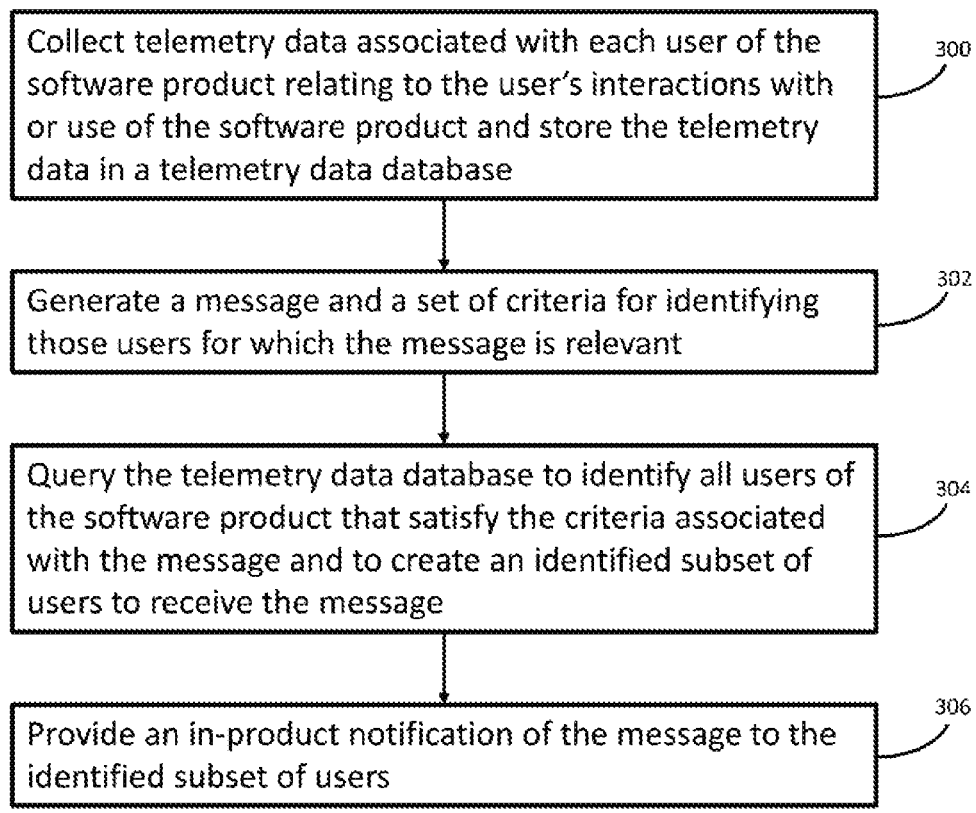
FIG. 3 schematically illustrates a flow diagram of one embodiment of the technology disclosed herein.

Referring now to FIG. 3, one embodiment of the methods disclosed here is illustrated. As indicated at 300, the method can include an act for collecting telemetry data associated with each user of the software product relating to the user's interactions with or use of the software product and storing the telemetry data in a telemetry data database. As indicated at 302, the method can include an act for generating a message and a set of criteria for identifying those users for which the message is relevant. As indicated at 304, the method can include an act for querying the telemetry data database to identify all users of the software product that satisfy the criteria associated with the message and to create an identified subset of users to receive the message. As indicated at 306, the method can include an act for providing an in-product notification of the message to the identified subset of users.

In other embodiments, the foregoing acts can also be combined with any one or more of the following additional acts: tracking, in the telemetry data database, which users have received an in-product notification for a particular message; storing each message and its corresponding criteria in a notification database; for each message stored in the notification database, periodically querying the telemetry data database to identify any additional users who satisfy the criteria associated with the message and have not previously received an in-product notification of the message and providing additional in-product notifications of the message to the additional users; and tracking, in the notification database, each time a particular message is returned to any user and periodically querying the notification database and deleting any messages that have not been provided to any user for a time interval that equals or exceeds a predetermined period of time.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for sending in-product notifications to individual users of a software product or to a specifically identified subset of users of the software product selected via their previously observed interactions with the software product, the system comprising:
   one or more processors; and
   one or more computer-readable media having stored thereon instructions that are executable by the one or more processors, including instructions that are executable to configure the computer system to perform at least the following:
   collect telemetry data associated with each user of the software product relating to the user's interactions with or use of the software product and store the telemetry data in a telemetry data database;
   generate a message and a set of criteria for identifying those users for which the message is relevant;
   query the telemetry data database to identify all users of the software product that satisfy the criteria associated with the message and to create an identified subset of users to receive the message; and
   provide an in-product notification of the message to the identified subset of users.

2. The system of claim 1, wherein one or more computer-readable media further have stored thereon instructions that are executable by the one or more processors to configure the computer system to perform at least the following:
   track, in the telemetry data database, which users have received an in-product notification for a particular message.

3. The system of claim 2, wherein one or more computer-readable media further have stored thereon instructions that are executable by the one or more processors to configure the computer system to perform at least the following:
   store each message and its corresponding criteria in a notification database.

4. The system of claim 3, wherein one or more computer-readable media further have stored thereon instructions that are executable by the one or more processors to configure the computer system to perform at least the following:
   for each message stored in the notification database, periodically query the telemetry data database to identify any additional users who satisfy the criteria associated with the message and have not previously received an in-product notification of the message; and
   provide additional in-product notifications of the message to the additional users.

5. The system of claim 4, wherein the telemetry data database is part of a connected cloud service that exposes an API that the software product calls and collects data indicative of current client side configuration and user information.

6. The system of claim 5, wherein the API returns to the user any new in-product notifications identified for that particular user.

7. The system of claim 6, wherein the telemetry data associated with a user comprises user information including any one or more of userID online user ID, machine ID, instance ID or similar ID used by the system to identify a particular user.

8. The system of claim 7, wherein the telemetry data associated with a user further comprises client side configuration data including any one or more of version, locale or SKU.

9. The system of claim 8, wherein the telemetry data associated with a user further comprises usage data indicative of the user's use of and interaction with the software product or portions thereof.

10. The system of claim 9, wherein usage data further comprises error condition data indicative of the occurrence of a software error and conditions existing at the time of the occurrence of the software error.

11. The system of claim 10, wherein the software product incorporates processes for displaying notifications to the user.

12. The system of claim 10, wherein the message is provided to each user via a pop-up modal dialog within the software product.

13. The system of claim 10, wherein one or more computer-readable media further have stored thereon instructions that are executable by the one or more processors to configure the computer system to perform at least the following:
   track, in the notification database, each time a particular message is returned to any user; and
   periodically query the notification database and delete any message that have not been provided to any user for a time interval that equals or exceeds a predetermined period of time.

14. A method for sending in-product notifications to individual users of a software product or to a specifically identified subset of users of the software product selected via their previously observed interactions with the software product, the method comprising:
   collecting telemetry data associated with each user of the software product relating to the user's interactions with or use of the software product and store the telemetry data in a telemetry data database;
   generating a message and a set of criteria for identifying those users for which the message is relevant;
   querying the telemetry data database to identify all users of the software product that satisfy the criteria associated with the message and to create an identified subset of users to receive the message; and
   providing an in-product notification of the message to the identified subset of users.

15. The method of claim 14 further comprising tracking, in the telemetry data database, which users have received an in-product notification for a particular message.

16. The method of claim 15 further comprising storing each message and its corresponding criteria in a notification database.

17. The method of claim 16 further comprising:
   for each message stored in the notification database, periodically querying the telemetry data database to identify any additional users who satisfy the criteria associated with the message and have not previously received an in-product notification of the message; and
   providing additional in-product notifications of the message to the additional users.

18. The method of claim 17, wherein the telemetry data database is part of a connected cloud service that exposes an API that the software product calls at every startup of the software product and collects data indicative of current client side configuration and user information.

19. The method of claim 18, wherein the API returns to the user any new in-product notifications identified for a particular user of the software product by that user.

20. A system for sending in-product notifications to individual users of a specifically identified subset of users of a software product selected via their previously observed interactions with the software product, the system comprising:

one or more processors; and one or more computer-readable media having stored thereon instructions that are executable by the one or more processors, including instructions that are executable to configure the computer system to perform at least the following:

store a collection of notifications to be sent to one or more identified users of the software product and their selected configuration in a cloud service;

expose, by the cloud service, a web API having details of current client/product side configuration, including version, Locale and SKU, and user information, including userID and VS Sign In ID for each user of the software product;

look up applicable notifications in the cloud storage and return them to the client of each identified user to which a particular notification is relevant;

display the notification returned by the web API through invoking the user and software configuration information by the client software product; and mark the notification as sent in the cloud storage to prevent sending the notification multiple times.

\* \* \* \* \*